F. TAYLOR.
VEHICLE WHEEL.
APPLICATION FILED MAR. 18, 1916.
1,262,140.
Patented Apr. 9, 1918.
3 SHEETS—SHEET 1.
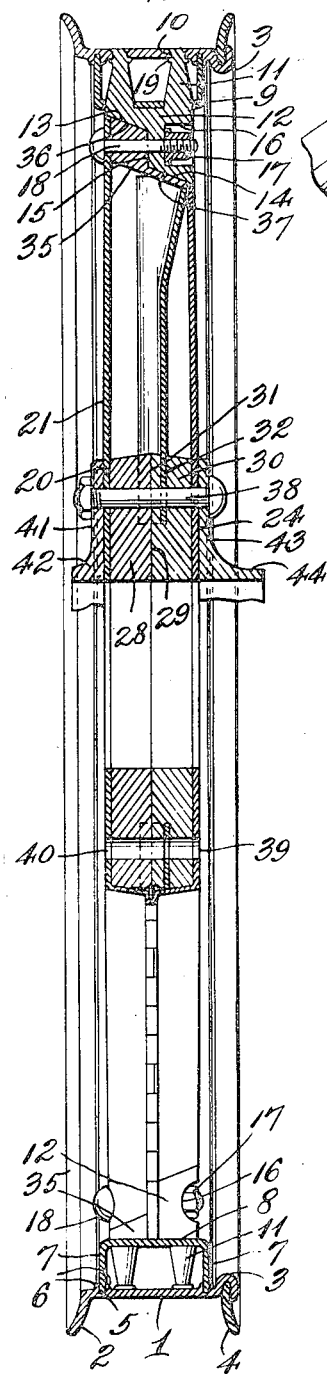
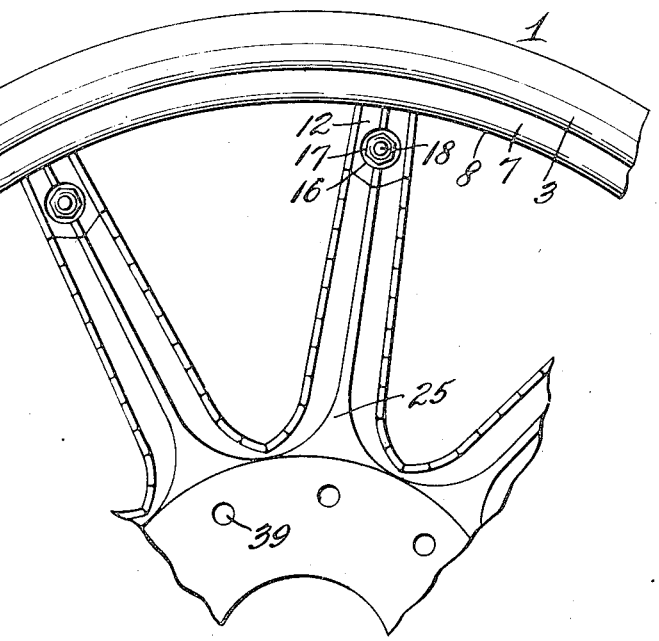
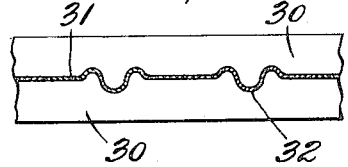
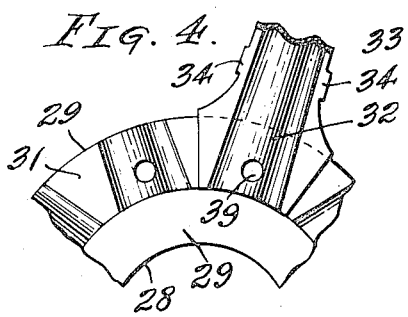
Inventor.
Fred Taylor
by B.W. Crockett
Atty.

F. TAYLOR.
VEHICLE WHEEL.
APPLICATION FILED MAR. 18, 1916.

1,262,140.

Patented Apr. 9, 1918.
3 SHEETS—SHEET 2.

Inventor.
Fred Taylor
by B.W. Brockett
Atty.

F. TAYLOR.
VEHICLE WHEEL.
APPLICATION FILED MAR. 18, 1916.

1,262,140.

Patented Apr. 9, 1918.
3 SHEETS—SHEET 3.

Inventor.
Fred Taylor
by
Atty.

UNITED STATES PATENT OFFICE.

FRED TAYLOR, OF CLEVELAND, OHIO.

VEHICLE-WHEEL.

1,262,140.  Specification of Letters Patent.  Patented Apr. 9, 1918.

Application filed March 18, 1916. Serial No. 85,216.

*To all whom it may concern:*

Be it known that I, FRED TAYLOR, citizen of the United States, residing at Cleveland, in the county of Cuyahoga and State of Ohio, have invented certain new and useful Improvements in Vehicle-Wheels, of which the following is a specification.

This invention relates to a vehicle wheel and particularly to a device of that character made up of sheet metal for the most part with the rim and felly removable from the web.

More specifically the invention relates to a vehicle wheel made up of front and rear side plates forming the web, a reinforcing inner wheel structure formed of spoke reinforcing portions, a central hub clamping said spoke reinforcing portions and a rim and felly structure adapted to be removably secured to the ends of the spoke portions by suitable clamping devices.

The invention also relates to features concerning the arrangement of the rim and felly and to a dual wheel formed of two wheel members similar to the one already referred to.

The invention may be further briefly summarized as consisting in the construction and combination of parts hereinafter set forth in the following description, drawings and claims.

Figure 5:
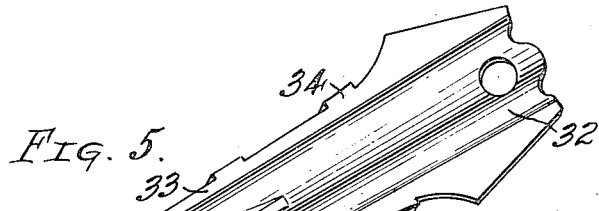
Figure 6:
Figure 7:
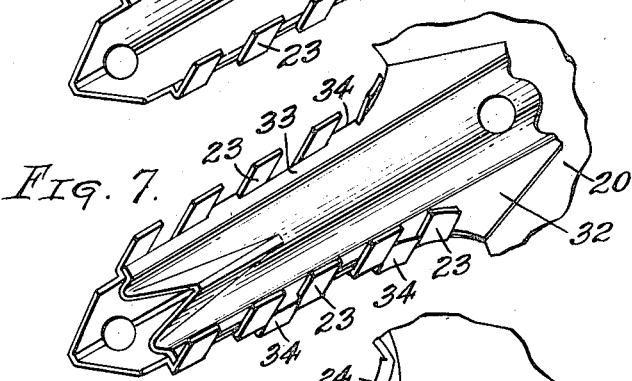
Figure 10:
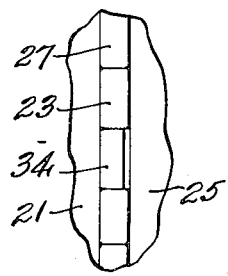
Figure 8:
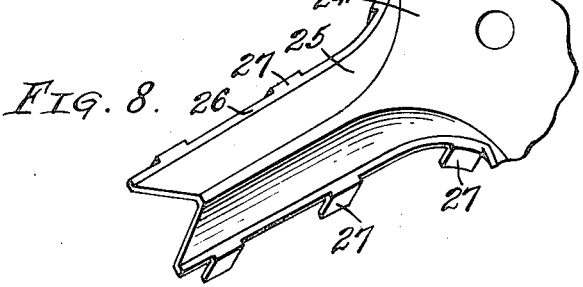
Figure 9:
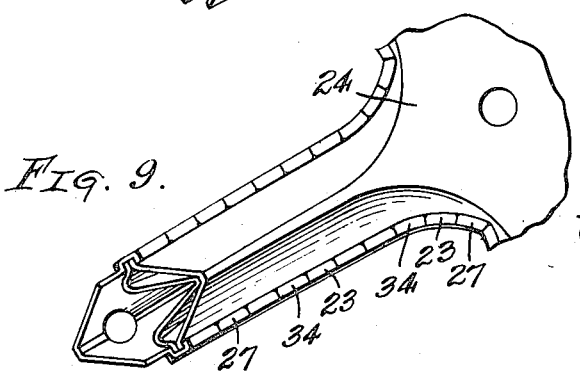
Figure 11:
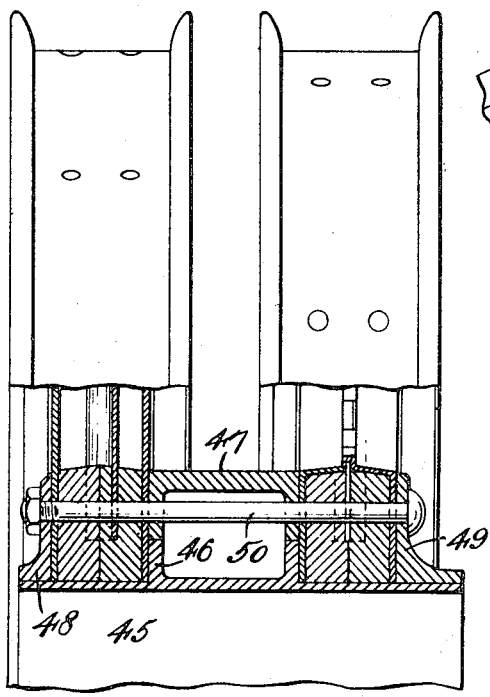
Figure 12:
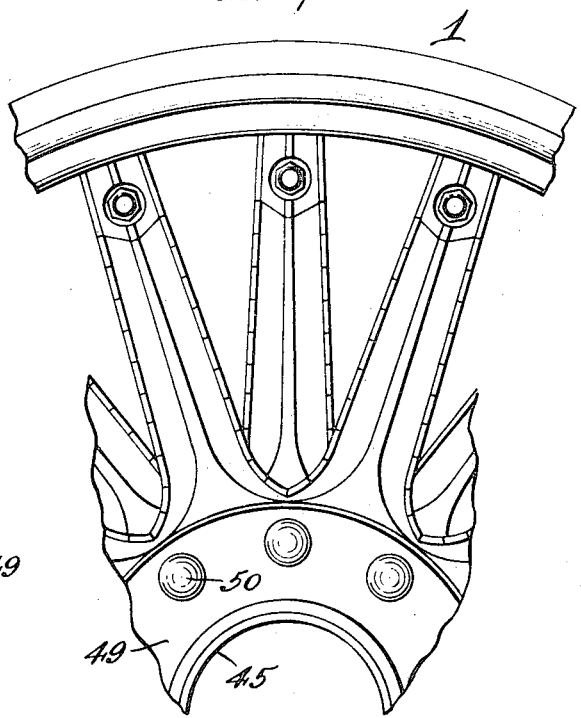
Figure 13:
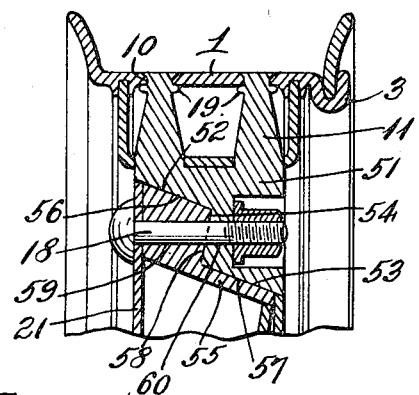

Referring to the drawings Figure 1 is a side elevation of a portion of a wheel constructed according to the invention; Fig. 2 is a vertical section; Fig. 3 is a view of the edge of the hub rings shown in elevation with the reinforcing spoke members in section; Fig. 4 is a side elevation of one of the hub rings showing one of the spoke reinforcing members in place and showing a depression in the ring for receiving the shank of another one of these spoke reinforcing members; Fig. 5 is a perspective view of one of the spoke reinforcing members; Fig. 6 is a perspective view of one of the spoke portions of the rear member; Fig. 7 is a perspective view of this same portion with the reinforcing member in place; Fig. 8 is a perspective view of one of the spoke portions of the front plate; Fig. 9 is a perspective view of the parts shown in Figs. 5, 6, 7 and 8 assembled; Fig. 10 is a view in elevation showing the interlocking lugs of the several spoke portions swaged into a uniform bead; Fig. 11 is a view partly in elevation and partly in section showing a dual wheel made up of two wheel portions of this type; Fig. 12 is a side elevation of a portion of this dual wheel; and Fig. 13 is a view showing a modified form of spoke clamping mechanism.

In carrying out the invention 1 represents a suitable rim which is provided with an inner flange 2 and an inwardly extending bead 3 adapted to receive an outer removable flange 4 this structure being capable of modification to suit any preferred form of rim. The inner portion of the rim is provided near its edges with recesses 5 preferably rolled into the rim and forming inwardly extending spaced beads 6, these beads being arranged in pairs as shown. Engaging in these beads are outwardly extending flanges 7 forming a part of the felly 8. The felly is provided at points corresponding to the spoke ends with pairs of openings 9 in alinement with openings 10 formed in the rim 1. Engaging in each pair of these openings are studs 11 forming part of the spoke clamping members 12 each of which is provided with inclined faces 13 and 14 out of alinement with each other or in different planes and spaced by a straight portion 15. The intermediate portion of each of these clamping members carrying the straight face 15 is provided with a recess 16 for receiving a nut 17 engaging the shank of a clamping bolt 18. The studs 11, as stated, pass through the openings 9 and are provided with beads 19 on the inside of the rim and the ends of these studs are reduced and riveted in the openings 10. By this arrangement it will be seen that the flanges 7 when forced into the recess 5 prevent the lateral displacement of the felly with respect to the rim and the studs passing through the felly and riveted in the rim hold these parts firmly together.

The inner web portion of the wheel is made up of a rear plate member comprising a hub portion 20 and rear spoke portions 21, each of which is of V shape channel section with a marginal flat flange 22 as shown in Fig. 6. Extending outward from the edge of this flange 22 are spaced lugs 23 for a purpose to be described. The wheel web also includes a front plate consisting of a hub portion 24, and spoke portions 25 somewhat similar to the rear spoke portion 21 and of the type shown in Fig. 8, the portion being of a V shape channel section with marginal flat flanges 26 corresponding to the flat flanges 22. These flanges are provided at their edges with rearwardly extending spaced lugs 27 corresponding to some of the spaces between the lugs 23.

Within the wheel web casing formed by the front and rear plates is a reinforcing hub spoke structure comprising a hub ring consisting of inner peripheral portions 28 which have inner flat faces meeting at a line 29 as shown in Fig. 2 and outer peripheral portions 30 which are formed with flat meeting faces 31 interrupted in a radial line with respect to each spoke by nesting corrugations and projections as shown in Fig. 3. Engaging in the recess formed by these nesting corrugations are the hub portions 32 of the reinforcing spoke members which are corrugated throughout their length to correspond to the corrugations of the recess between the hub rings so that the reinforcing members will be held tightly between these rings. These reinforcing spoke members have laterally extending flanges 33 as shown in Fig. 5 and these flanges have rearwardly extending lugs 34 at their edges adapted to mesh into such of the spaces between the lugs 23 of the rear spoke portion as are unoccupied by the lugs 27 of the front spoke portion 25.

In order to have a complete understanding of the lugs of the several parts attention is directed to Figs. 5, 6, 7 and 8 wherein the rear spoke portion 21 is provided on each of its flanges 22 with five outwardly extending lugs spaced evenly, the spaces being substantially equal to the width of the lugs. While the reinforcing spoke member, as shown in Fig. 5, at each of its flanges, is provided with two lugs 34 arranged to pass between the second and third and fourth and fifth lugs of the rear spoke member leaving spaces between one and two and three and four, these spaces being occupied by the lugs 27 of the front spoke member. These lugs are afterward bent down and pressed with great pressure into a uniform bead as shown in Fig. 10. These inter-locking lugs prevent the front and rear plate portions of the web of the wheel from working one with respect to the other.

Each of the spoke portions is provided with a clamping block 35 extending inside of the front and rear plate portions as shown in Fig. 2 and this block and the end of the rear plate portion in each instance are provided with openings for receiving the shank of the bolt 18 as shown in Fig. 2. Each of these blocks 35 is provided with an incline face 36 coöperating with the face 13 and an incline face 37 coöperating with the face 14.

The several parts of the wheel are held together by bolts 38 passing through openings 39 and 40 in the front and rear plate members and through the flange 41 of the hub sleeve 42 and further through the flange 43 of the front hub ring 44. These bolts pass through the hub rings and through the hub portions of the spoke reinforcing members.

In utilizing the wheel just described as one of the wheel members of a dual wheel an inner hub sleeve 45 is utilized and it is provided with peripheral flanges 46 spaced apart and engaging between the two complete wheel members, an annular ring 47 channel shaped in structure being also arranged between the two wheel members at the periphery of the flanges 46 to complete the hub between the wheels. A rear hub clamping ring 48 is provided to engage the rear face of the rear wheel member and a front hub clamping ring 49 is provided to engage the outside of the front wheel member. Through bolts 50 pass through the several clamping rings 48 and 49 and hold these several parts together. The wheel members of this dual wheel structure are arranged so that the spokes of one are opposite to the spaces between the spokes of the other or, in other words, are staggered with respect to each other, as shown in Fig. 12, so that the clamping bolts of the rear rim and felly structure may be reached and released through the outside wheel member and the rear rim and felly structure may be removed by passing its clamping members through the spaces between the spokes of the front wheel member.

In the modification shown in Fig. 13 the felly clamp comprises a body portion 51 having an inclined face 52 in one plane and an inclined face 53 in another plane, these two faces being separated by another face 54 which is slightly at an angle to a plane touching the side of the wheel. The clamping member carried by the spoke comprises a body portion 55 having a face 56 for coöperation with the face 52, a face 57 for coöperation with the face 53 and the face 58 for coöperation with the face 54. In like manner this face 58 between the two faces 56 and 57 is at an angle to a plane touching the side of the wheel and when this face and the face 54 are brought into engagement there is a tendency for the material between the faces 56 and 58 to act as a wedge in the notch formed by the faces 52 and 54 of the felly clamping member with the result that the wheel is not spread in any manner and the parts are drawn up snug and tight and relieve the bolts of any shearing strain. Both of these clamping members are supplied with suitable openings 59 and 60 for receiving the clamping bolts 18.

Having described my invention, I claim:—

1. A wheel web structure comprising front and rear plates forming a hub portion and spoke portions and marginal inter-locking lugs carried by the plate portions and formed into a bead.

2. A web structure for wheels comprising front and rear plates comprising a hub portion and spoke portions, and marginal interlocking lugs carried by said plates and formed into a bead, said bead being pressed into symmetrical uniform shape throughout.

3. A web structure for wheels comprising front and rear plates consisting of a hub portion and spoke portions, a reinforcing member between each of the spoke portions and passing out between the adjacent edges of such portions, and marginal inter-locking lugs carried by the three parts, the plate portions and the reinforcing member, all of said lugs being formed into a uniform bead.

4. In a wheel structure a web comprising a hub, spoke portions, a spoke clamping member at the end of each spoke portion having inclined faces in different planes with a face between said incline planes at a slight angle to a plane touching the side of the wheel, a rim and clamping members carried by the rim and conforming to the shape of the spoke clamping members, and a bolt for drawing said clamping members together.

5. A vehicle wheel, comprising a rim, a hub, spoke members carried thereby, each spoke member at its outer end having faces inclined in opposite directions to a plane perpendicular to the axis of the wheel, and coöperating spoke clamping members carried by the rim, one for each spoke, said clamping members having inclined faces to correspond with the inclined faces of the spoke members.

6. A vehicle wheel, comprising a rim, a hub, spoke members carried thereby, each spoke member at its outer end having faces inclined in opposite directions to a plane perpendicular to the axis of the wheel, coöperating spoke clamping members carried by the rim, one for each spoke, said clamping members having inclined faces to correspond with the inclined faces of the spoke members, and bolts detachably connecting said spoke members to the clamping members.

7. A vehicle wheel, comprising a rim, a hub, spoke members carried thereby, each spoke member at its outer end having two faces inclined in one direction to a plane perpendicular to the axis of the wheel and an intermediate face in another plane, the coöperating spoke clamping members carried by the rim, one for each spoke, said clamping members having faces to correspond with the faces of the spoke members.

8. A vehicle wheel, comprising a rim, a hub, spoke members carried thereby, each spoke member at its outer end having two faces inclined in one direction to a plane perpendicular to the axis of the wheel and an intermediate face in another plane, coöperating spoke clamping members carried by the rim, one for each spoke, said clamping members having faces to correspond with the faces of the spoke members, and bolts passing through openings in said intermediate face for securing together the spoke members and clamping members.

9. A vehicle wheel, comprising a rim, a hub, spoke members carried thereby, each spoke member at its outer end having two faces inclined in one direction to a plane perpendicular to the axis of the wheel and an intermediate face inclined in the opposite direction to said plane, and coöperating spoke clamping members carried by the rim, one for each spoke, said clamping members having inclined faces to correspond with the inclined faces of the spoke member.

10. A vehicle wheel, comprising a rim, a hub, spoke members carried thereby, each spoke member at its outer end having two faces inclined in one direction to a plane perpendicular to the axis of the wheel and an intermediate face inclined in the opposite direction to said plane, coöperating spoke clamping members carried by the rim, one for each spoke, said clamping members having inclined faces to correspond with the inclined faces of the spoke member, and bolts passing through said openings in said intermediate face for securing together said spoke members and clamping members.

In testimony whereof I affix my signature.

FRED TAYLOR.

Copies of this patent may be obtained for five cents each, by addressing the "Commissioner of Patents, Washington, D. C."